(12) United States Patent
Hert

(10) Patent No.: US 8,716,625 B2
(45) Date of Patent: May 6, 2014

(54) WORKPIECE CUTTING

(75) Inventor: Thomas Hert, Ditzingen (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 22 days.

(21) Appl. No.: 13/365,541

(22) Filed: Feb. 3, 2012

(65) Prior Publication Data

US 2013/0200051 A1  Aug. 8, 2013

(51) Int. Cl.
*B23K 26/38* (2006.01)

(52) U.S. Cl.
USPC ............ 219/121.71; 219/121.79; 219/121.85

(58) Field of Classification Search
USPC .............. 219/121.71, 121.72, 121.7, 121.79, 219/121.8, 121.81, 121.82, 121.84
See application file for complete search history.

(56) References Cited

U.S. PATENT DOCUMENTS

| | | | | |
|---|---|---|---|---|
| 3,931,458 A * | 1/1976 | Dini | ............................. | 358/3.29 |
| 4,169,976 A * | 10/1979 | Cirri | ........................ | 219/121.72 |
| 4,303,824 A * | 12/1981 | Morgan et al. | ............ | 219/121.84 |
| 4,473,424 A * | 9/1984 | Sorko-Ram | ................... | 156/268 |
| 5,593,606 A * | 1/1997 | Owen et al. | ............... | 219/121.71 |
| 5,731,047 A * | 3/1998 | Noddin | ......................... | 427/555 |
| 5,841,099 A * | 11/1998 | Owen et al. | ............... | 219/121.69 |
| 5,841,102 A * | 11/1998 | Noddin | ..................... | 219/121.71 |
| 5,868,950 A * | 2/1999 | Noddin | ............................. | 216/18 |
| 5,910,255 A * | 6/1999 | Noddin | ............................. | 216/18 |
| 5,910,261 A * | 6/1999 | Mori et al. | ............... | 219/121.71 |
| 5,965,043 A * | 10/1999 | Noddin et al. | ............ | 219/121.71 |
| 5,973,290 A * | 10/1999 | Noddin | ....................... | 219/121.7 |
| 6,018,196 A * | 1/2000 | Noddin | ........................... | 257/777 |
| 6,023,041 A * | 2/2000 | Noddin | ..................... | 219/121.71 |
| 6,066,830 A * | 5/2000 | Cline et al. | ................ | 219/121.69 |
| 6,103,992 A * | 8/2000 | Noddin | ..................... | 219/121.71 |
| 6,130,015 A * | 10/2000 | Noddin et al. | .................. | 430/22 |
| 6,132,853 A * | 10/2000 | Noddin | ........................... | 428/209 |
| 6,203,891 B1 * | 3/2001 | Noddin | ........................... | 428/209 |
| 6,284,999 B1 * | 9/2001 | Virtanen et al. | .......... | 219/121.67 |
| 6,407,363 B2 * | 6/2002 | Dunsky et al. | ............ | 219/121.71 |
| 6,610,960 B2 * | 8/2003 | De Steur et al. | .......... | 219/121.71 |
| 6,642,476 B2 * | 11/2003 | Hamann | ..................... | 219/121.7 |
| 6,657,159 B2 * | 12/2003 | McKee et al. | ............. | 219/121.71 |
| 6,696,665 B2 * | 2/2004 | Heerman | ................. | 219/121.69 |
| 6,706,998 B2 * | 3/2004 | Cutler | ....................... | 219/121.72 |
| 6,749,285 B2 * | 6/2004 | Liu et al. | ......................... | 347/47 |
| 6,781,092 B2 * | 8/2004 | De Steur et al. | .......... | 219/121.71 |
| 6,791,060 B2 * | 9/2004 | Dunsky et al. | .............. | 219/121.7 |

(Continued)

FOREIGN PATENT DOCUMENTS

JP            10244394 A       9/1998

OTHER PUBLICATIONS

Trumpf Werkzeugmashinen GmbH + Co. KG video on "TruLaser 1030 Materialflexibilitat", retrieved on You Tube site http://www.youtube.com/user/TRUMPFtube#p/c/10/YpZBeGVSQvk, from seconds 11 to 19 in video, retrieved Dec. 3, 2009.

*Primary Examiner* — Dana Ross
*Assistant Examiner* — Jimmy Chou
(74) *Attorney, Agent, or Firm* — Fish & Richardson P.C.

(57) ABSTRACT

In some aspects, methods includes forming intersecting apertures in a workpiece with a laser beam by moving the laser beam along intersecting line paths, and cutting out a portion of a shape from the workpiece by moving the laser beam along a continuous final path extending around an intersection point of the intersecting line paths.

23 Claims, 6 Drawing Sheets

(56) References Cited

U.S. PATENT DOCUMENTS

| | | | |
|---|---|---|---|
| 6,897,405 B2 * | 5/2005 | Cheng et al. | 219/121.71 |
| 6,911,620 B2 * | 6/2005 | Lipman et al. | 219/121.68 |
| 7,009,141 B1 * | 3/2006 | Wool et al. | 219/121.73 |
| 7,057,133 B2 * | 6/2006 | Lei et al. | 219/121.71 |
| 7,241,667 B2 * | 7/2007 | Park et al. | 438/458 |
| 7,259,354 B2 * | 8/2007 | Pailthorp et al. | 219/121.72 |
| 7,807,940 B2 * | 10/2010 | Nishiwaki et al. | 219/121.67 |
| 7,897,893 B2 * | 3/2011 | Kilthau et al. | 219/121.67 |
| 8,158,493 B2 * | 4/2012 | Shah et al. | 438/463 |
| 8,481,887 B2 * | 7/2013 | Alpay et al. | 219/121.71 |
| 2002/0023907 A1 * | 2/2002 | Morishige | 219/121.85 |
| 2002/0125232 A1 * | 9/2002 | Choo et al. | 219/121.69 |
| 2003/0015503 A1 * | 1/2003 | Hamann | 219/121.7 |
| 2003/0047545 A1 * | 3/2003 | McKee et al. | 219/121.71 |
| 2003/0132208 A1 * | 7/2003 | Cutler | 219/121.72 |
| 2003/0213787 A1 * | 11/2003 | Dunsky et al. | 219/121.75 |
| 2004/0016095 A1 * | 1/2004 | Liu et al. | 29/90.01 |
| 2004/0017430 A1 * | 1/2004 | Mizuyama et al. | 347/47 |
| 2004/0112881 A1 * | 6/2004 | Bloemeke et al. | 219/121.71 |
| 2004/0206733 A1 * | 10/2004 | Hillebrand et al. | 219/121.71 |
| 2006/0091126 A1 * | 5/2006 | Baird et al. | 219/121.72 |
| 2007/0075060 A1 * | 4/2007 | Shedlov et al. | 219/121.72 |
| 2007/0187373 A1 * | 8/2007 | Kilthau et al. | 219/121.71 |
| 2007/0284347 A1 * | 12/2007 | Morikazu | 219/121.71 |
| 2008/0078752 A1 * | 4/2008 | Bischoff et al. | 219/121.72 |
| 2008/0179303 A1 * | 7/2008 | Garry | 219/121.71 |
| 2008/0272095 A1 * | 11/2008 | Alpay et al. | 219/121.71 |
| 2009/0127762 A1 * | 5/2009 | Kilian | 269/296 |
| 2010/0236740 A1 * | 9/2010 | Mourad et al. | 162/289 |
| 2010/0300098 A1 * | 12/2010 | Hwang et al. | 60/641.14 |
| 2010/0303673 A1 * | 12/2010 | Hwang et al. | 422/120 |
| 2011/0043002 A1 * | 2/2011 | Laflamme et al. | 296/203.01 |
| 2011/0143827 A1 * | 6/2011 | Flickinger et al. | 460/110 |
| 2011/0240617 A1 * | 10/2011 | Xu et al. | 219/121.72 |
| 2012/0135847 A1 * | 5/2012 | Fukasawa et al. | 501/11 |

* cited by examiner

WORKPIECE CUTTING

TECHNICAL FIELD

This invention relates to workpiece cutting.

BACKGROUND

Automated material processing machines are often used to machine and form workpieces, such as metal plate-like workpieces, into desired finished products. The material processing machines can be used to form different sized and shaped holes, openings, and bends in the workpieces. Various different types of material processing machines can be used to carry out these functions.

SUMMARY

In one aspect, methods include forming intersecting apertures in a workpiece with a laser beam by moving the laser beam along intersecting line paths, and cutting out a portion of a shape from the workpiece by moving the laser beam along a continuous final path extending around an intersection point of the intersecting line paths.

In another aspect, computer program codes are configured to move a laser beam head along intersecting line paths to form apertures in a workpiece, and to move the laser beam head along a continuous final path extending around an intersection point of the intersecting lines to cut out a portion of a shape to be cut from the workpiece.

In another aspect, sheet metal workpiece processing machines include a laser beam head disposed on a laser beam head movement unit, a workpiece support having multiple supporting elements, the supporting elements being spaced apart from one another so as to support a plate-like workpiece, and a control unit in communication with the laser beam head movement unit, the control unit being configured to move the laser beam cutting head relative to the workpiece support to perform a cutting operation on the workpiece. The cutting operation includes forming apertures in a workpiece with a laser beam by moving the laser beam along intersecting line paths, and cutting out a portion of a shape from the workpiece by moving the laser beam head along a continuous final path extending around an intersection point of the intersecting line paths.

Embodiments can include one or more of the following features.

In some embodiments, the apertures have first and second ends that lie along a peripheral region of the shape to be cut from the workpiece.

In some embodiments, moving the laser beam along the continuous final path crosses each of the intersecting apertures at least once. In some cases, multiple residual workpiece fragments removed from segments located between adjacent intersecting apertures fall between slats supporting the workpiece.

In some embodiments, moving the laser along the continuous final path includes the entire shape, and the laser is moved and operated continuously along the continuous final path.

In some embodiments, the continuous final path begins at an inner region and extends radially outward.

In some embodiments, the continuous final path includes an inner path and an outer path. In some cases, the inner path is a spiral (e.g., an Archimedean spiral). In some cases, the inner path smoothly transitions into the outer path. In some cases, the outer path defines the shape to be cut from the workpiece.

In some embodiments, a portion of the continuous final path at least partially defines the shape to be cut from the workpiece. In some cases, the laser beam is moved along four intersecting line paths.

In some embodiments, moving the laser beam along the intersecting line paths forms two to six intersecting line paths.

In some embodiments, the shape to be cut from the workpiece is an ellipse (e.g., a circle).

In some embodiments, the intersecting line paths are separated by congruent angles.

In some embodiments, ends of the apertures are located along the shape to be cut from the workpiece.

In some embodiments, the apertures include slits formed through the workpiece.

In some embodiments, moving the laser beam includes moving a laser beam head positioned adjacent to the workpiece.

In some embodiments, the intersecting apertures are arranged so that ends of the apertures lie along a peripheral region of the shape to be cut from the workpiece and are substantially equally spaced apart from one another along the shape to be cut from the workpiece.

Embodiments can have one or more of the following advantages.

The processing machines and methods described herein can form openings in a plate-like workpiece faster and more efficiently than certain conventional workpiece processing machines and methods. For example, the processing machines and methods described herein can cut a desired shape of metal from a workpiece by forming fewer, typically intersecting, inner cuts before forming the final cutout profile. Certain conventional processes cut shapes from a workpiece by forming a series of generally perpendicular (e.g., grid-like) inner cuts and then cut the final shape. Forming non-perpendicular intersecting inner cuts as described herein permits cutting shapes from a workpiece by forming fewer inner cuts than the processes that form multiple perpendicular grid-like inner cuts.

The processing machines and methods described herein can also form cutouts having higher quality edges than cutouts formed by certain conventional workpiece processing machines and systems by gradually reducing the size and weight of residual workpiece segments to be removed from the workpiece. Higher quality edges can also be formed as a result of forming fewer inner cuts that intersect the final profile of the cutout to be formed in the workpiece.

The processing machines and methods described herein can cut a desired shape of metal from a workpiece by forming multiple residual workpiece fragments inside the desired shape. The residual workpiece fragments formed are typically small enough to fall between supporting elements that support the workpiece being processed to avoid inadvertently affecting workpiece processing quality and improving workpiece processing.

The details of one or more embodiments are set forth in the accompanying drawings and the description below. Other aspects, features, and advantages of the invention will be apparent from the description and drawings, and from the claims.

DETAILED DESCRIPTION

Various shaped openings (e.g., cutouts) can be formed in plate-like workpieces (e.g., metal sheets) using processing machines described herein. To remove material from the workpiece to form the cutout, several inner cuts (e.g., apertures) are formed inside a region of the workpiece that is to be cut out or removed from the remainder of the workpiece. Then, material of the region to be cut out is removed in a spiral-like manner so that inner, residual portions of the workpiece are gradually removed in fragments. As a result, desired shaped openings can be formed in the workpiece relatively quickly and reliably.

Figure 1:
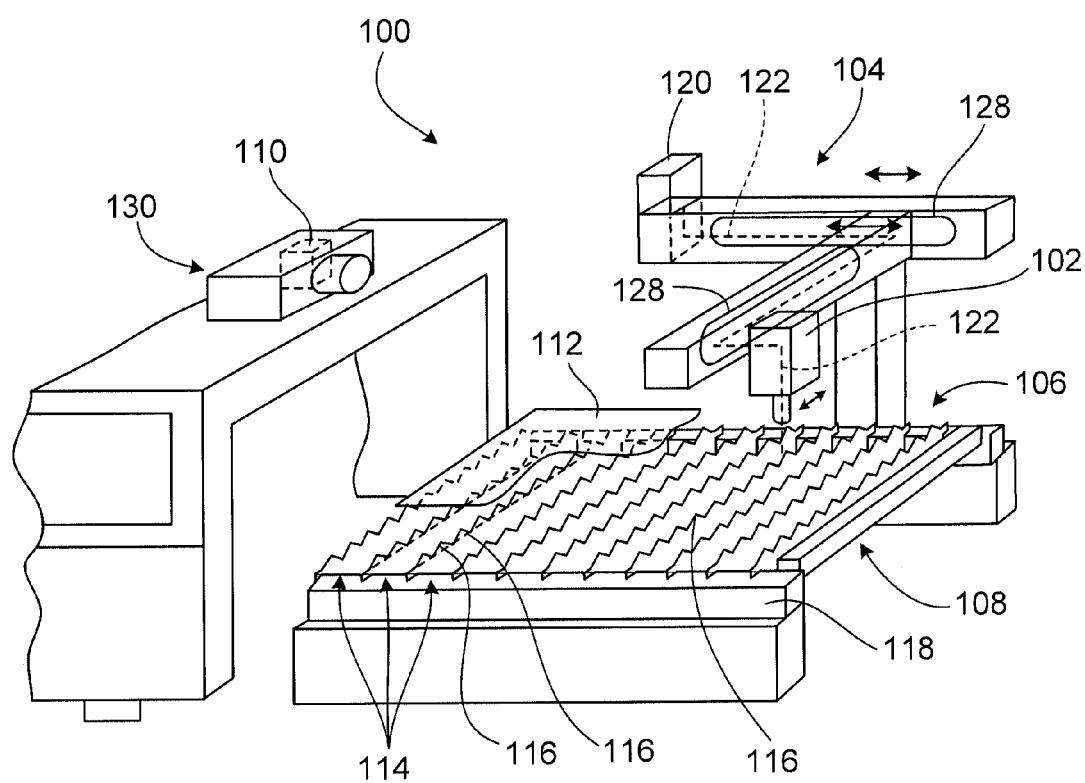
FIG. 1 is a perspective view of a processing machine for plate-like workpieces.
Figure 5:
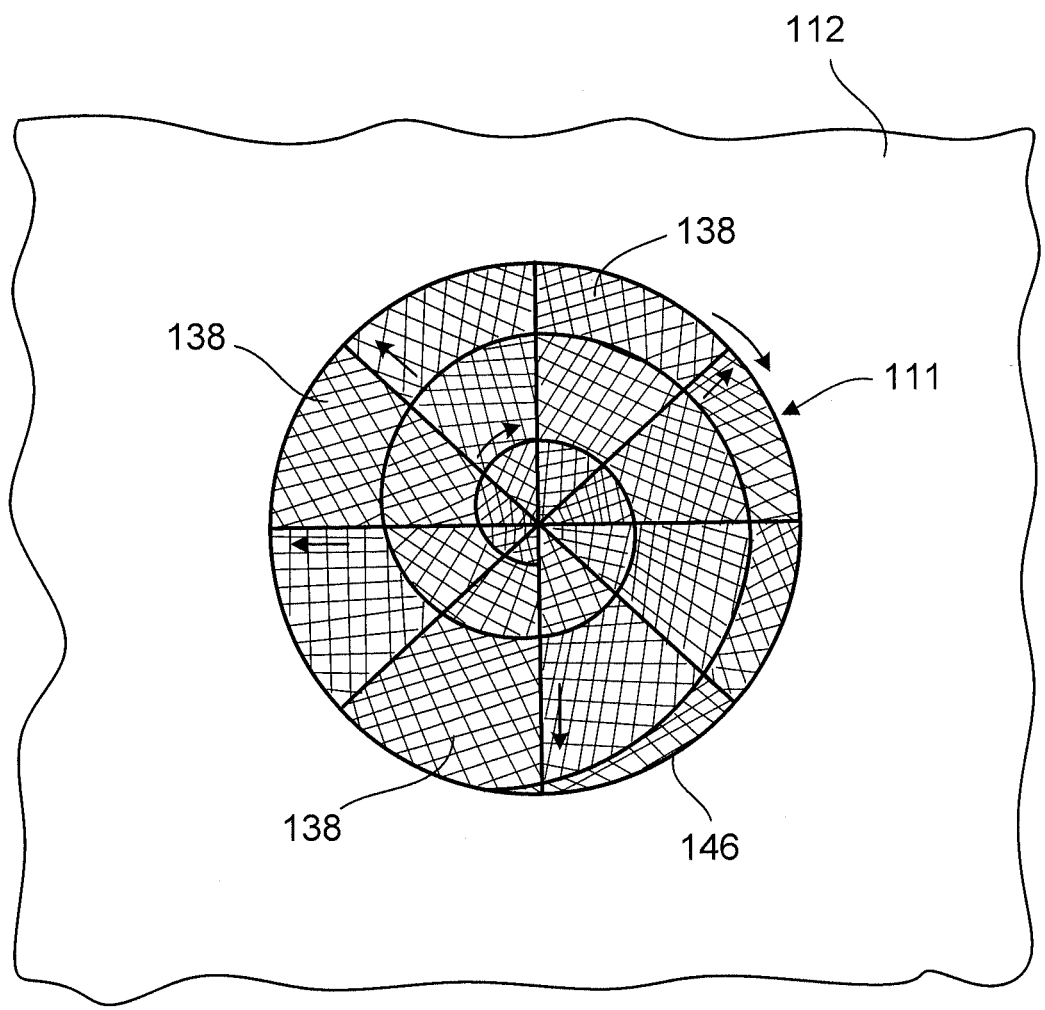
FIG. 5 is a schematic view of a final shape profile being formed in the workpiece of FIG. 2 along a final profile of the cutout of FIG. 2.

Referring to FIG. 1, a processing machine (e.g., a laser cutting machine) 100 for machining plate-like workpieces (e.g., metal sheets) includes a laser beam head 102 disposed on a laser head movement unit 104, a workpiece support 106, a workpiece support movement unit 108 to move the workpiece support 106, and a control unit 110 that is in communication with the laser head movement unit 104 and the workpiece support movement unit 108. The control unit 110 is configured to move and operate the laser beam head 102 relative to the workpiece support 106 to perform a cutting operation forming a cutout 111 (shown in FIG. 5) on a workpiece 112.

The workpiece support 106 includes multiple rest elements (e.g., thin beam-like slats) 114 arranged adjacent to one another to act as a supporting bed for the workpiece 112. The slats 114 are typically arranged substantially parallel to one another to uniformly support the workpiece 112. The slats 114 are separated by a spacing that permits residual workpiece fragments (e.g., fragments cut from the workpiece 112 while forming the cutout 111) to fall between the slats 114 and away from the workpiece processing area. Typically, the slat spacing is about 1 inch to about 20 inches (e.g., about 1 inch to about 4 inches).

The slats 114 are typically thin beams having multiple supporting elements (e.g., peaks extending upward) 116 on which the workpiece 112 rests during processing. The supporting elements 116 are separated by a spacing that permits residual workpiece fragments to fall from the workpiece 112 while the laser beam head 102 formed cutouts 111 in the workpiece 112. Typically, the supporting elements 116 are separated about 1 inch to about 20 inches (e.g., about 1 inch to about 4 inches). As discussed below, inner cuts form inside of an area defining the cutout 111 on the workpiece 112 are arranged so that the residual workpiece fragments that fall from the workpiece 112 are smaller than the spacing between the slats 114 or the spacing between the supporting elements 116. Typically, the residual workpiece fragments are smaller than half the spacing between the slats 114.

The supporting elements 116 extend upward to create relatively small contact surface areas with the workpiece 112. Small contact surface areas between the supporting elements 116 and the workpiece 112 help to prevent a laser beam emitted from the laser beam head 102 from inadvertently processing (e.g., cutting or welding) the supporting elements 116 or other portions of the slats 114. For example, slats having large contact areas supporting the workpiece 112 (e.g., slats having a flat workpiece supporting surface) could increase the likelihood that a laser beam processing the workpiece 112 would process or cut both the slat and the workpiece 112. As a result, the workpiece could become welded to the slat.

The slats 114 are arranged along and secured (e.g., fastened) to a frame 118 that structurally supports the slats 114 and the workpiece 112 disposed thereon. The frame 118 is connected to the workpiece support movement unit 108 to move the workpiece support 106 relative to the laser beam head 102. The workpiece support movement unit 108 may include one or more workpiece support movement devices, such as gear or pulley systems, actuators (e.g., pneumatic or magnetic actuators), or other types of devices to move the workpiece support 106.

The laser beam head 102 moves relative to the workpiece 112 and directs a laser beam toward the workpiece 112 to process (e.g., cut) the workpiece 112. A laser unit (e.g., a $CO_2$, solid state laser unit or a fiber laser unit). 120 generates a laser beam 122 that is guided (e.g., via a beam guide) to the movable laser beam head 102. The laser beam head 102 redirects and focuses the laser beam 122 onto the workpiece 112 to concentrate energy and cut the workpiece 112. The laser beam head 102 is mounted to a laser head movement unit 104 that moves the laser beam head 102 relative to the workpiece 112 along multiple (e.g., two) axes of motion. As shown, the laser head movement unit 104 includes at least two laser head drives 128 to move the laser head 102 along the two axes. The laser head drives 128 include any of various suitable devices, such as gear or pulley systems, actuators (e.g., pneumatic or magnetic actuators), or other types of devices to move the laser beam head 102 relative to the workpiece 112.

The control unit 110 is in communication (e.g., wired or wireless communication) with the laser beam head movement unit 104, the laser unit 120, and the workpiece support movement unit 108 to control and monitor the operation and the position of the laser beam 122. The control unit 110 is typically connected to a computer device 130 to setup and execute various cutting operations using the processing machine 100. The computer device 130 can include a video monitor, one or more input devices (e.g., keyboard, touch screen, mouse, or other similar devices), and a software program (e.g., CAD/CAM program) to design the size and shapes of cutouts to be removed from the workpiece 112. Based on the sizes and shapes of the various cutouts designed and laid out by an operator (e.g., a machine operator, a machine programmer, or a product designer), the software program can determine an appropriate machining sequence to form the cutouts. In some cases, the software program considers several different machining sequences and chooses the most efficient (e.g., most efficient in terms of machining time) sequence. In determining the machining sequence, the various cuts to be formed along the inner portion of the cutouts (e.g., to remove residual workpiece fragments) are arranged so that the residual workpiece fragments are smaller than the distance between the slats 114.

To produce parts using the processing machine 100, the operator first sets up and programs the processing machine 100 using the computer device 130. Programming the processing machine 100 can include designing the finished part to be produced (e.g., the sizes, shapes, and locations of cutouts to be formed on the workpiece) using the computer device 130. Alternatively, a pre-completed 3D model (e.g., a CAD model) defining a desired finished part can be loaded into the computer device 130.

Figure 2:
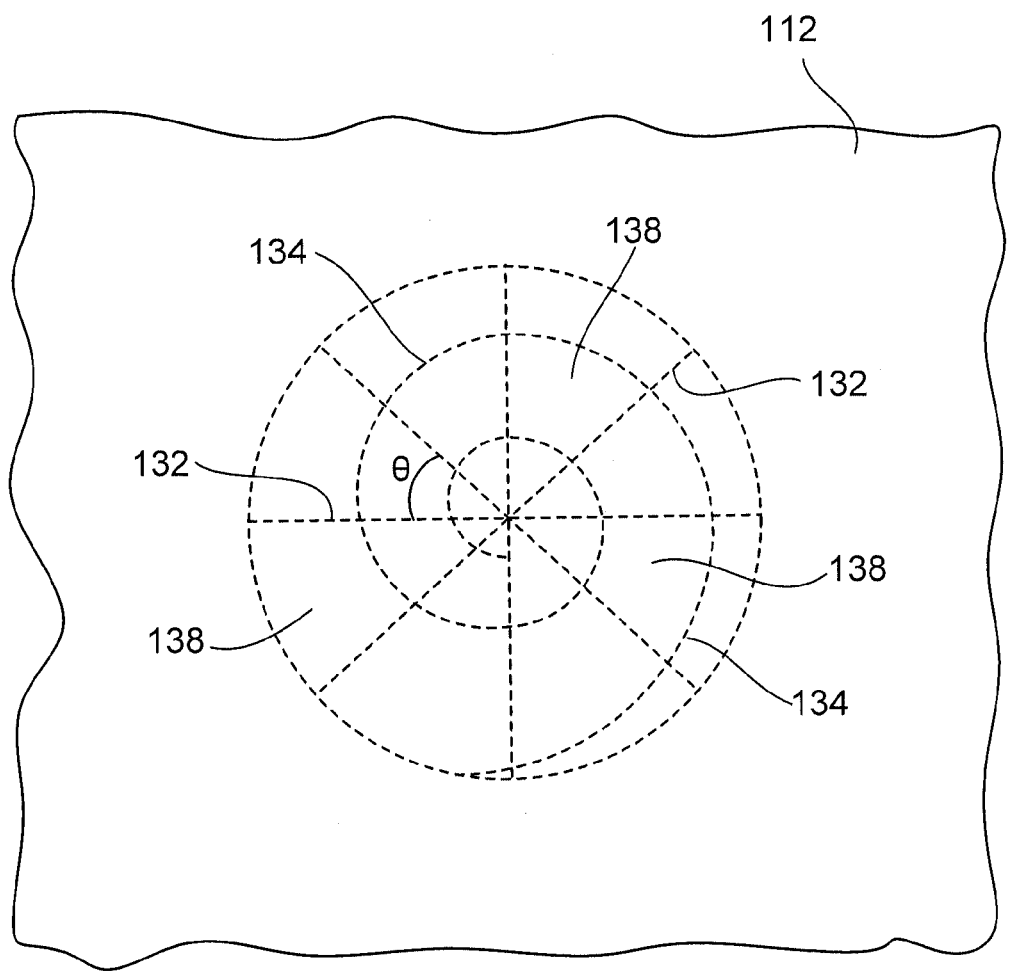
FIG. 2 is a schematic view of a cutting path for removing a cutout from a workpiece.

As part of the programming, the software program processes the sizes of different cutouts (e.g., the diameter of circular cutouts) to be formed into the workpiece 112. Referring to FIG. 2, from the sizes of the cutouts 111, the software program calculates various cutting parameters including a number of inner, intersecting cutting lines 132 to be formed inside the cutout, the angles θ between adjacent intersecting cutting lines 132, and a number of revolutions of the spiral-like cutting path 134 that removes the residual workpiece fragments from the workpiece 112 forming the final cutout. The end points of the intersecting cutting lines 132 generally define the final shape of the cutout 111. As shown in FIG. 2, for example, the end points of the intersecting cutting lines 132 lie along a circle to be cut out of the workpiece. The number of intersecting cutting lines 132 and the number of revolutions of the spiral-like cutting path 134 around an intersection of the intersecting cutting lines 132 influence the size of the resulting residual workpiece fragments 138 formed while processing the workpiece 112. Therefore, based on the size of the cutout to be formed in the workpiece 112, these parameters are typically selected in combination to achieve a desired size and configuration of the residual workpiece fragments 138 to be trimmed from the workpiece 112. Generally, forming more intersecting cutting lines 132 results in smaller workpiece fragments 138 being formed. However, increasing the number of intersecting cutting lines 132 formed also typically increases the amount of laser piercing points (e.g., laser starting and stopping points) formed around the subsequent edge of the cutout 111. Such starting and stopping points could potentially affect edge quality. While the piercing points for cutting the intersecting cutting lines 132 are moved slightly inward from the edge of the cutout 111, the piercing may still leave piercing marks on the cutout contour, for example, as a result of changes in a laser focus diameter, which can affect the cutting width. Therefore risks of harming the contour edge of the cutout 111 can be reduced (e.g., minimized) when the piercing points are spaced slightly from the edge or the cutout 111.

FIG. 2 illustrates cutting paths in the workpiece 112 for forming a circular cutout 111 having a diameter that is about 0.1 inches to about 100 inches (e.g., about 0.5 inches to about 8 inches). The cutting paths are laid out along four intersecting, straight lines 132 having an equal angular spacing θ between one another. In addition to the straight lines 132, a spiral-like (e.g., a spiral) path 134 is laid out that spans from a starting point near an intersection 136 of the intersecting lines 134 and extends around the intersection 136 toward the perimeter of the final shape of the cutout 111 to be removed from the workpiece 112. The spiral-like path 134 extends around the intersection 136 two times while extending outward into the final shape of the cutout 111. As shown, this configuration of the straight lines 132 and the spiral path 134 will produce multiple residual workpiece fragments 138 when the laser beam 122 is operated along the spiral path 134. The cutting parameters (e.g., the number of straight lines 132 and the number of rotations of the spiral path 134) are selected so that the residual workpiece fragments 138 formed during laser cutting are smaller than (e.g., less than half of) the distance between the slats 114 or the distance between the supporting elements 116. In the example shown, the cutting paths are configured for forming a cutout on a workpiece using a processing machine having a slat spacing and support element spacing of about 1 inch to about 20 inches (e.g., about 1 inch to about 4 inches) so that the residual workpiece fragments 138 are able to fall away from the workpiece 112.

With the cutting parameters determined, the control unit 110 can process (e.g., by receiving data from the computer device 130) instructions and operate the processing machine 100 to form the cutout 111 on the workpiece 112. The cutout 111 is removed by moving the laser beam head 102 along the cutting paths (e.g., the straight lines 132 and the spiral path 134) and operating the laser beam 122 to form a series of apertures in the workpiece 112.

Figure 3:
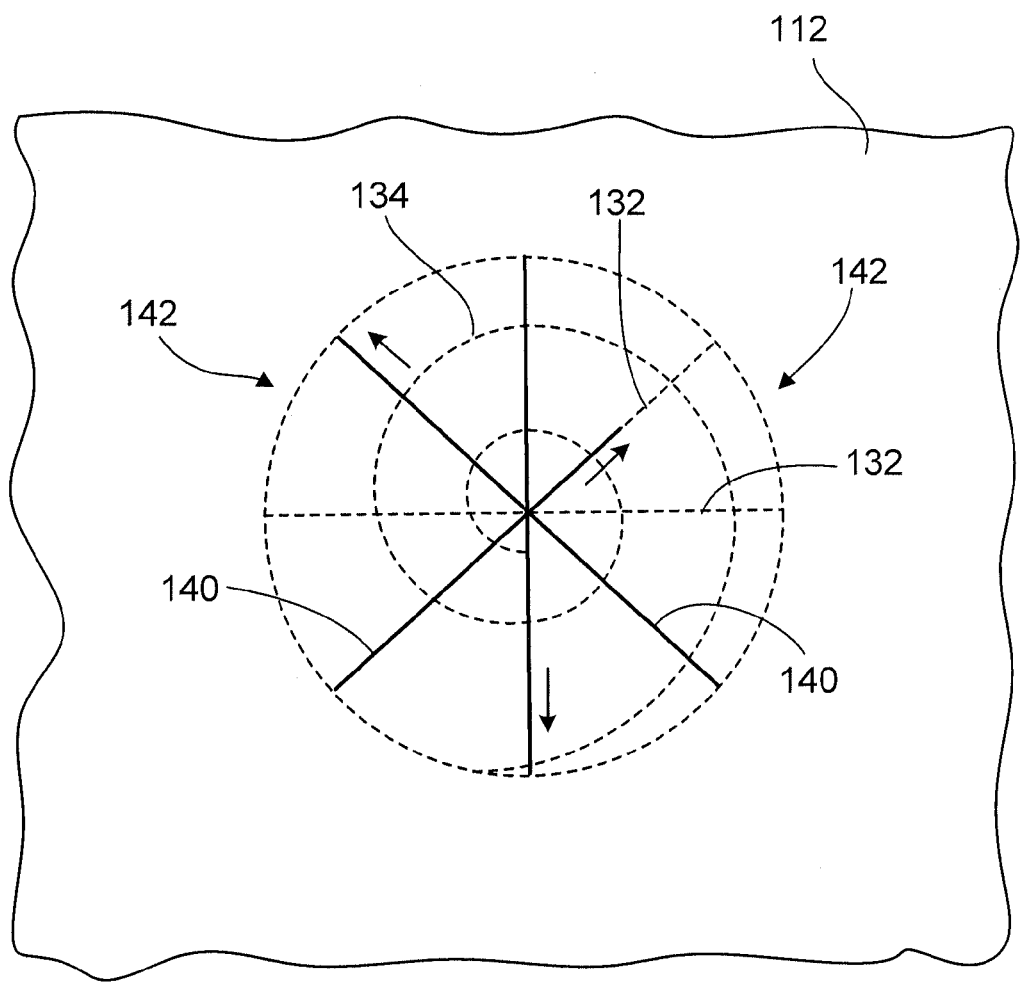
FIG. 3 is a schematic view of straight, inner apertures being formed in the workpiece of FIG. 2 along straight, inner portions of the cutting path.

Referring to FIG. 3, the laser beam 122 (e.g., via the laser head movement unit 104) is first moved along the straight lines 132 forming straight apertures 140 along the straight lines 132. The straight apertures 140 form residual segments 142 still connected to the workpiece 112 by connecting regions that substantially define to final shape of the cutout 111. In this case, the apertures 140 intersect at a center point of the circle to be cut out and thus form multiple pie-slice-shaped segments 142 that remain attached at their outer peripheries to the remainder of the workpiece 112.

In some embodiments, the apertures 140 are formed in a sequential manner to reduce (e.g., minimize) the spacing between a laser stop point of one aperture and a laser starting point of an adjacent aperture, which can reduce the time needed to move the laser beam head 102 (and the laser beam 122) between the different apertures. For example, as shown in FIG. 3, the laser beam 122 can be operated from a lower-right position to an upper-left position to form an aperture, then the laser beam head 102 (with the laser beam 122 turned off) is moved to a top position. The laser beam 122 is operated from the top position to the bottom position to form a substantially vertical aperture. From the bottom position, the laser beam head 102 (with the laser beam 122 turned off) is moved to a lower-left position and the laser beam 122 is then turned on and moved to an upper-right position to form an aperture. While not shown, once the laser beam reaches the upper-right position and the laser beam head 102 can be moved to a right position from which the laser beam 122 can be turned on and moved to a left position to form a substantially horizontal aperture. This operating sequence can result in more efficient (e.g., faster) cutting processes.

Figure 4:
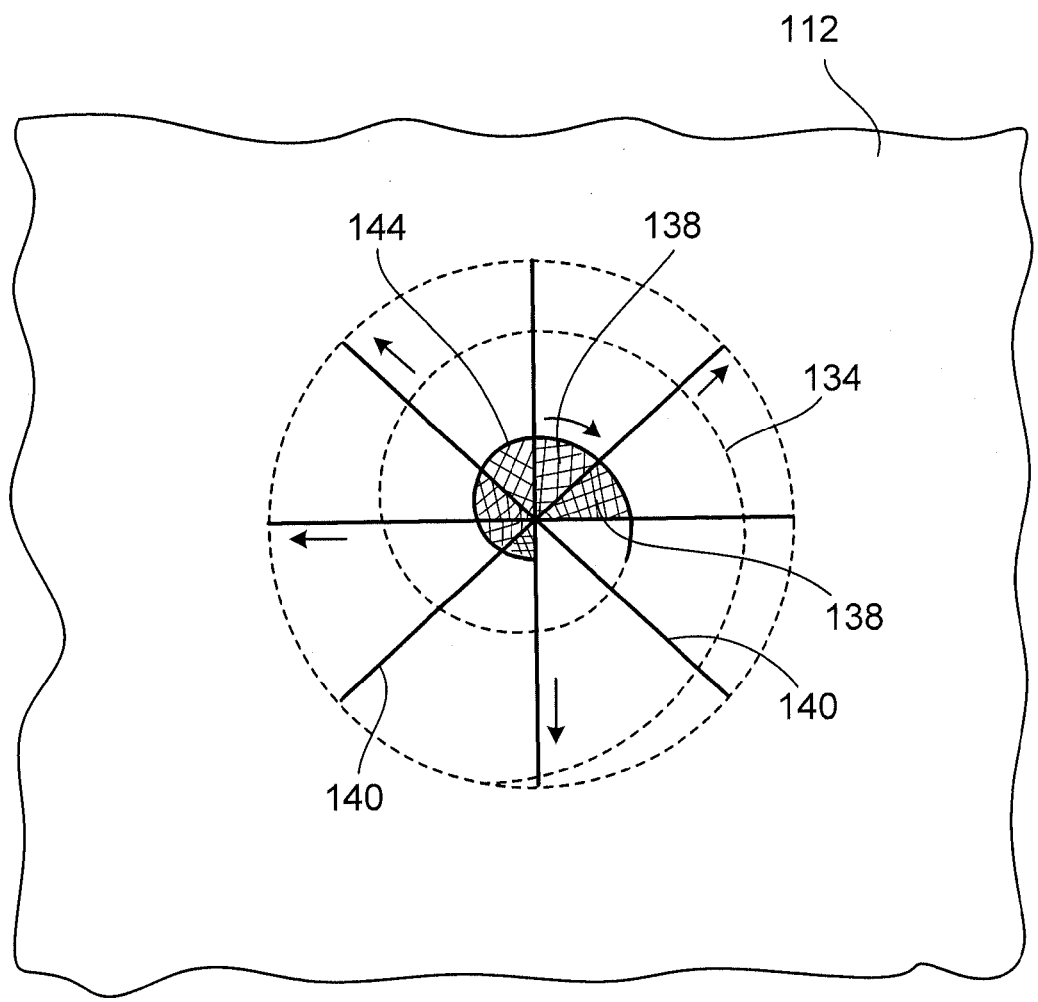
FIG. 4 is a schematic view of a spiral, inner aperture being formed in the workpiece of FIG. 2 along a spiral portion of the cutting path.

Once the straight apertures 140 are formed along all of the intended straight lines 132, the residual segments 142 can be removed to form the final cutout 111. Referring to FIG. 4, the residual segments 142 are removed from the workpiece 112 by operating the laser beam 122 along the spiral path 134. As the laser beam 122 cuts along the spiral path 134, a spiral aperture 144 is formed around the central region of the cutout 111. As a result, residual workpiece fragments 138 are trimmed from the residual segments 142. As shown, once trimmed from the residual segments 142, the residual workpiece fragments 138 are free to fall from the workpiece 112 between the slats 114 (shown as cross-hatched sections). Due to the selection of the cutting parameters, the residual workpiece fragments 138 are generally smaller than half the distance between the slats 114.

Removing material from the residual segments 142 in increments in this manner reduces the size and the weight of the residual segments 142 gradually. As a result, when the laser beam 122 reaches the outer perimeter of the final shape of the cutout 111 (shown in FIG. 5), the reduced weight of the residual segments 142 helps to prevent them from sagging during cutting of the final shape. By preventing sagging, the resulting edge of the cutout 111 formed when the outermost portions (i.e., along the perimeter) of the residual segments 142 are fully removed is typically closer to perpendicular to the workpiece 112 and has a higher quality (e.g., a cleaner cut is produced). Typically, the laser beam 122 smoothly and continuously transitions from cutting the spiral aperture 144 to cutting a final aperture 146 defined by the final shape of the cutout 111.

Forming a cutout in a workpiece in this manner permits removing the inner residual portions of the cutout at a gradually increasing rate resulting in faster workpiece processing times than certain other cutting methods. Forming residual segments by forming fewer, intersecting lines that intersect at a common point (i.e., as opposed to multiple parallel lines formed to create multiple squares) can result in fewer laser beam start and stop points around the cutout shape to be cut, and thus permit faster cut times. For example, for a laser head unit that weighs about 10 to 15 pounds, such accelerations and decelerations of the laser head can result in a significant loss of time. Additionally, a higher quality cutting edge that is less likely to have cutting errors (e.g., non-uniformities or blemishes), such as piercing marks, can be formed.

While the inner path has been described as being shaped as an Archimedean spiral, other shapes are possible. For example, in some embodiments, the inner path is shaped as a Cornu spiral, a Fermat's spiral, a hyperbolic spiral, a lituus, a logarithmic spiral, or a spiral of Theodoruous. In some embodiments, the inner path is a non-spiral shape that extends around and away from the central region of the cutout along a non-continuous path. For example, the inner path can extend away from the center of the cutout non-uniformly (e.g., along a zig-zagged, sinusoidal or otherwise non-spiral like path). The inner path can also be formed as multiple substantially straight segments arranged around the center of the cutout.

While the inner path has been described as beginning at a starting point near the intersection of the intersecting lines, other starting points are possible. For example, in some embodiments, the inner path begins in a region that is closer to the perimeter of the cutout than the central region of the cutout. For example, the inner path can begin away from the central region and travel a shorter distance before reaching the final shape of the cutout than would typically be required when the inner path begins near the center of the cutout, which can result in a faster cutting time.

In some embodiments, a relatively large portion of the inner portion of the workpiece material is removed as one or more large pieces and then a spiral-like aperture is formed to remove the remaining material in workpiece residual fragments. For example, a shape (e.g., a circle) can be cut from the material to be removed to form the cutout and then the inner path can be formed that extends towards the final shape of the cutout.

While the cutouts have been described as being circular, other shaped cutouts are possible. For example, in some embodiments, the cutouts are elliptical, polygonal (e.g., polygons having four, five, six, seven, eight, nine, ten or more sides), oblong (e.g., having both curved and straight sides). Other symmetrical or asymmetrical shapes can alternatively be formed.

Figure 6:
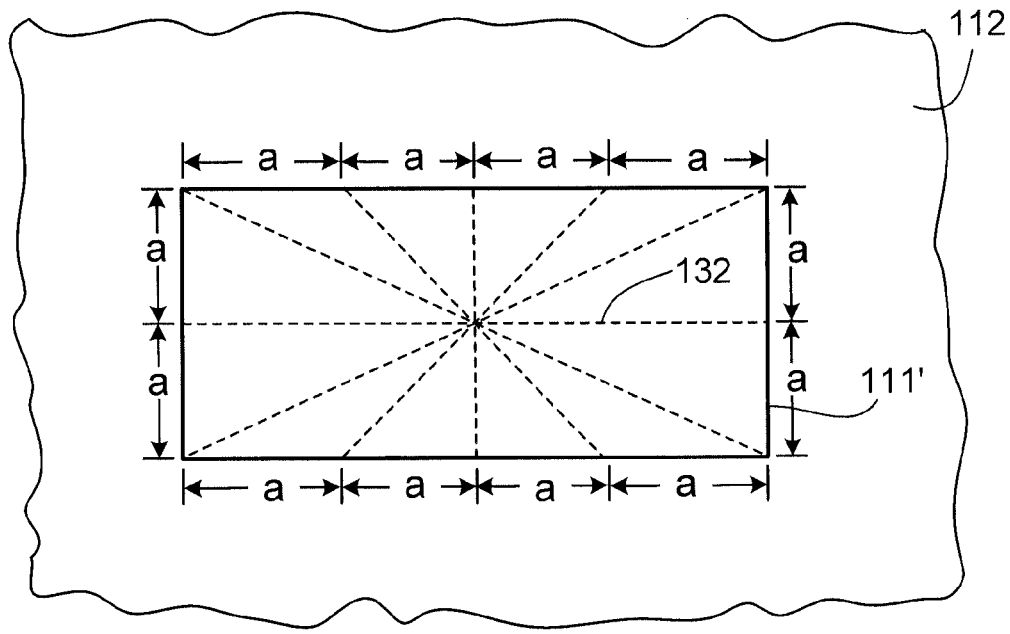
FIG. 6 is a schematic view of another cutting path for removing a cutout from a workpiece.
Figure 7:
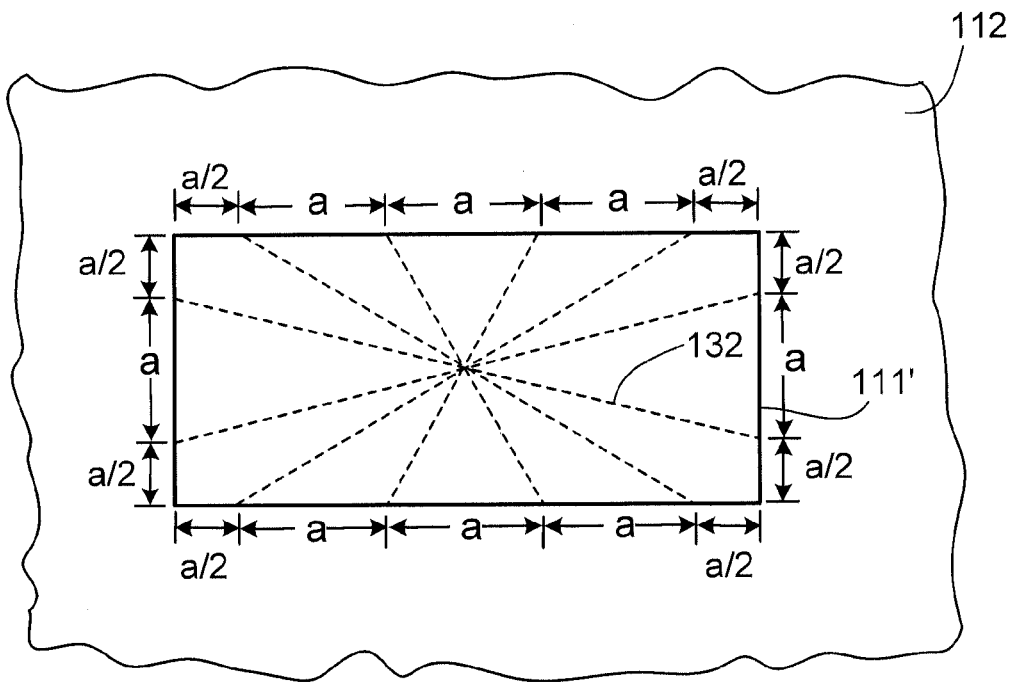
FIG. 7 is a schematic view of another cutting path for removing a cutout from a workpiece.

While the intersecting lines have been described as being separated by equal angles, different configurations of the intersecting lines are possible. In some implementations, different intersecting lines can be separated by different angles. For example, referring to FIG. 6, when cutting a rectangular shaped cutout 111' from a workpiece, the intersecting lines can be arranged so that end points of the intersecting lines are separated by the same distance, a, along the perimeter of the rectangle. Referring to FIG. 7, the intersecting lines can also be arranged so that none of them pass through the corners of the rectangular cutout 111'.

While the intersecting lines have been described as having end points that are located along the shape to be cut from the workpiece, other arrangements are possible. In some implementations, the intersecting lines are formed having end points located near the periphery of, but not collinear with, the shape to be cut from the workpiece.

While the intersecting lines have described as intersecting at or substantially near the central region of the cutout, other arrangements are possible. For example, in some embodiments, the intersecting lines intersect at a point that is away from the central region of the cutout.

While the intersecting lines have been described as being substantially straight, other types of lines can be used. For example, in some embodiments, the intersecting lines include curved or zig-zig shaped portions.

While the intersecting lines has been described as being substantially continuous, other types of lines can be used. For example, in some embodiments, the intersecting lines are intermittently formed (e.g., dashed or segmented lines) and the inner path is arranged to intersect the intersecting lines.

While the inner, intersecting lines have been described as intersecting one another, other arrangements are possible. For example, in some embodiments, the inner lines do not intersect. Additionally, in some embodiments, the intersecting lines are formed only near the perimeter of the cutout to be formed. For example, the intersecting lines can be formed as small segment cuts near the peripheral regions of the final shape of the cutout to be formed. A large portion (e.g., a circular portion) of the material inside cutout can be removed (e.g., by a circular cut) leaving multiple workpiece segments that are separated by the small segment cuts. Then, the spiral-like inner cutting path can remove residual workpiece fragments from the workpiece segments to form the final cutout. This cutting process can be used to increase processing quality, for example, when the size of the entire cutout is smaller than the distance between the supporting elements 116.

While the software program has been described as determining inner cutting path parameters based on the size and shape of the workpiece cutout, other methods are possible. For example, a user can input the cutting parameters manually.

While methods for forming cutouts in a workpiece have been described as being used on a laser cutting machine, other machine configurations are possible. For example, these cutting methods can be implemented on a mechanical (e.g., router or milling) machine.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs (i.e., one or more modules of computer program instructions) encoded on computer storage medium for execution by, or to control the operation of, the control units or data processing apparatuses. Alternatively or additionally, the program instructions can be encoded on an artificially generated propagated signal, for example, a machine-generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described in this specification can be performed by one or more programmable processors executing one or more computer programs to perform actions by operating on input data and generating output. The processes can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising
moving the laser beam along at least two individual intersecting line paths, thereby forming intersecting apertures in a workpiece, each of the line paths intersecting one another at an intersection point such that each of the apertures intersect one another at the intersection point; and
after forming the intersecting apertures, cutting out a portion of a shape from the workpiece by moving the laser beam along a continuous final path extending around and surrounding the intersection point of the intersecting line paths.

2. The method of claim 1, wherein the apertures have first and second ends that lie along a peripheral region of the shape to be cut from the workpiece.

3. The method of claim 1, wherein moving the laser beam along the continuous final path crosses each of the intersecting apertures at least once.

4. The method of claim 3, wherein a plurality of residual workpiece fragments removed from segments located between adjacent intersecting apertures fall between slats supporting the workpiece.

5. The method of claim 1, wherein moving the laser along the continuous final path comprises the entire shape, and the laser is moved and operated continuously along the continuous final path.

6. The method of claim 1, wherein the continuous final path begins at an inner region and extends radially outward.

7. The method of claim 1, wherein the continuous final path comprises an inner path and an outer path.

8. The method of claim 7, wherein the inner path is a spiral.

9. The method of claim 8, wherein the inner path is an Archimedean spiral.

10. The method of claim 7, wherein the inner path smoothly transitions into the outer path.

11. The method of claim 10, wherein the outer path defines the shape to be cut from the workpiece.

12. The method of claim 1, wherein a portion of the continuous final path at least partially defines the shape to be cut from the workpiece.

13. The method of claim 12, wherein the laser beam is moved along four intersecting line paths.

14. The method of claim 1, wherein moving the laser beam along the intersecting line paths forms two to six intersecting line paths.

15. The method of claim 1, wherein the shape to be cut from the workpiece is an ellipse.

16. The method of claim 1, wherein the shape to be cut from the workpiece is a circle.

17. The method of claim 1, wherein the intersecting line paths are separated by congruent angles.

18. The method of claim 1, wherein ends of the apertures are located along the shape to be cut from the workpiece.

19. The method of claim 1, wherein the apertures comprise slits formed through the workpiece.

20. The method of claim 1, wherein moving the laser beam comprises moving a laser beam head positioned adjacent to the workpiece.

21. The method of claim 1, wherein the intersecting apertures are arranged so that ends of the apertures lie along a peripheral region of the shape to be cut from the workpiece and are substantially equally spaced apart from one another along the shape to be cut from the workpiece.

22. A computer readable storage device storing program code that is executable by a process to perform operations comprising:
   moving a laser beam head along at least two individual intersecting line paths to form intersecting apertures in a workpiece, each of the line paths intersecting one another at an intersection point such that each of the apertures intersect one another at the intersection point; and
   after forming the intersecting apertures, moving the laser beam head along a continuous final path extending around and surrounding the intersection point of the intersecting lines to cut out a portion of a shape to be cut from the workpiece.

23. A sheet metal workpiece processing machine comprising:
   a laser beam head disposed on a laser beam head movement unit;
   a workpiece support comprising a plurality of supporting elements, the supporting elements being spaced apart from one another so as to support a plate-like workpiece; and
   a control unit in communication with the laser beam head movement unit, the control unit being configured to move the laser beam cutting head relative to the workpiece support to perform a cutting operation on the workpiece,
   wherein the cutting operation comprises:
   moving the laser beam along at least two individual intersecting line paths, thereby forming intersecting apertures in a workpiece, each of the line paths intersecting one another at an intersection point such that each of the apertures intersect one another at the intersection point; and
   after forming the intersecting apertures, cutting out a portion of a shape from the workpiece by moving the laser beam head along a continuous final path extending around and surrounding the intersection point of the intersecting line paths.

* * * * *